US011089797B2

(12) United States Patent
Hilmer et al.

(10) Patent No.: US 11,089,797 B2
(45) Date of Patent: Aug. 17, 2021

(54) PROCESS FOR PRODUCING FLAVOURED FOOD PARTICLES

(71) Applicant: Symrise AG, Holzminden (DE)

(72) Inventors: Jens-Michael Hilmer, Holzminden (DE); Eric Gruber, Holzminden (DE); Dirk Schrader, Holzminden (DE); Walter Bröckel, Bevern (DE)

(73) Assignee: Symrise AG, Holzminden (DE)

( * ) Notice: Subject to any disclaimer, the term of this patent is extended or adjusted under 35 U.S.C. 154(b) by 493 days.

(21) Appl. No.: 15/045,678

(22) Filed: Feb. 17, 2016

(65) Prior Publication Data

US 2016/0235095 A1 Aug. 18, 2016

(30) Foreign Application Priority Data

Feb. 17, 2015 (EP) .................................. 15155416

(51) Int. Cl.

| A23F 5/46 | (2006.01) |
|---|---|
| A23L 7/196 | (2016.01) |
| A23L 27/00 | (2016.01) |
| A23L 2/39 | (2006.01) |
| A23L 23/10 | (2016.01) |
| A23L 7/109 | (2016.01) |
| A23F 3/40 | (2006.01) |
| A23L 7/126 | (2016.01) |
| A23L 7/135 | (2016.01) |
| A23F 5/36 | (2006.01) |
| A23P 20/18 | (2016.01) |
| A23P 10/30 | (2016.01) |

(52) U.S. Cl.
CPC ............... *A23F 5/465* (2013.01); *A23F 3/40* (2013.01); *A23F 5/36* (2013.01); *A23F 5/46* (2013.01); *A23L 2/39* (2013.01); *A23L 7/109* (2016.08); *A23L 7/126* (2016.08); *A23L 7/135* (2016.08); *A23L 7/196* (2016.08); *A23L 23/10* (2016.08); *A23L 27/70* (2016.08); *A23L 27/72* (2016.08); *A23L 27/80* (2016.08); *A23P 10/30* (2016.08); *A23P 20/18* (2016.08); *A23V 2002/00* (2013.01)

(58) Field of Classification Search
CPC ........................................................ A23F 5/46
See application file for complete search history.

(56) References Cited

U.S. PATENT DOCUMENTS

| 3,660,115 A | 5/1972 | Revie |
| 4,880,649 A | 11/1989 | Holzner et al. |
| 5,496,574 A | 3/1996 | Rushmore et al. |
| 6,056,949 A | 5/2000 | Menzi et al. |
| 7,763,300 B2 * | 7/2010 | Sargent .................... A23F 5/465 426/443 |
| 8,119,173 B2 * | 2/2012 | Cheng .................... A24B 13/00 131/347 |
| 2003/0091696 A1 | 5/2003 | Panesar |

FOREIGN PATENT DOCUMENTS

| EP | 0 070 719 A1 | 1/1983 |
| EP | 1 224 273 B1 | 10/2007 |
| EP | 2 233 013 A1 | 9/2010 |
| WO | 98/32339 A1 | 7/1998 |
| WO | 2014/83422 A2 | 6/2014 |

* cited by examiner

*Primary Examiner* — Elizabeth Gwartney
(74) *Attorney, Agent, or Firm* — Dilworth & Barrese, LLP

(57) ABSTRACT

The present invention is in the field of the flavouring of foods. In particular, the present invention is directed to a process for the encapsulation of flavours and/or aromas. The particles are then later incorporated into the end preparation (the food), such as, for example, instant coffee. The focus is in particular firstly to obtain particles with high aroma loading in order to ensure a long-lasting aroma protection during storage, and secondly to control the particle properties in such a way that an optimum miscibility of the particles with foods is made possible. Decisive aspects in this connection are primarily shape, size and particle density. These aspects together are intended to bring about an improved taste experience for the end consumer when consuming the particles.

13 Claims, No Drawings

PROCESS FOR PRODUCING FLAVOURED FOOD PARTICLES

FIELD OF THE INVENTION

The present invention is in the field of the flavouring of foods. In particular, the present invention is directed to a process for the encapsulation of flavours and/or aromas. The particles are then later incorporated into the end preparation (the food), such as, for example, instant coffee. The focus is in particular firstly to obtain particles with high aroma loading in order to ensure a long-lasting aroma protection during storage, and secondly to control the particle properties in such a way that an optimum miscibility of the particles with foods is made possible. Decisive aspects in this connection are primarily shape, size and particle density. These aspects together are intended to bring about an improved taste experience for the end consumer when consuming the particles.

PRIOR ART

In foodstuffs and foods, aromas are often added to round off the taste profile. It is desirable here that the aromas remain stable for as long as possible in the food and are only released upon consumption by the consumer and are not lost during storage.

During the production of instant coffee, for example, it has therefore been attempted to apply coffee aroma, in particular the roast aroma of coffee, on dried coffee extract by spraying on an emulsion which comprises coffee oil. However, in the case of flavoured instant coffee, it is often the case that after opening the container in which the instant coffee is stored, the flavours evaporate all too rapidly.

In order to keep aroma losses as low as possible and to reduce them, the aromatic constituents are often encapsulated.

EP2233013 B1 discloses a process for producing grains of coated coffee grounds. The process comprises (i) the heating of a mixture of a coating composition and coffee grounds to a temperature below the melting temperature of the coating composition, at which the coating composition forms a coating on at least some of the coffee grounds; and (ii) the cooling of the mixture for providing grains which comprise coffee grounds which have a coating made of the coating composition on at least some of the surface of the coffee grounds.

WO0249450 discloses the replacement of coffee oil by an encapsulated aroma in an instant coffee beverage. Here, a water-insoluble aroma carrier (aroma solvent) is encapsulated with aroma which is intended to release the aroma upon release as a film floating on the surface of the poured coffee.

U.S. Pat. No. 3,989,852 discloses the creation of a high-viscosity spray matrix which is then sprayed onto a stirred powder through a nozzle, said powder consisting of a film former such as, for example, gum arabic. In this way, a pulverulent product with flavouring properties is produced.

U.S. Pat. No. 5,496,574 describes a process for encapsulating an aroma for beverage applications. For this, coffee oil is hydrolyzed and then sprayed in the form of an oil-in-water emulsion (consisting of hydrolyzed vegetable oil, water-soluble film formers) onto a soluble beverage powder (e.g. coffee powder).

U.S. Pat. No. 4,520,033 (Nestec 1985) describes the production of a foamed aroma capsule. For this, firstly an aroma emulsion is produced which is then foamed in a second step by introducing a gas such as, for example, nitrogen. This foamed aroma emulsion is then sprayed onto a powder such as, for example, coffee powder and stirred in the mixer. The resulting powder can then be mixed into a beverage powder such as, for example, instant coffee.

One problem of a coffee composition which comprises more than just a single coffee component is that, over the course of time, the individual components of the coffee composition segregate. This is often the result if the coffee composition is stored in a container for a long time and the small particles or denser components then settle to the bottom of the container, whereas lighter or less dense components remain at the top of the container. The end consumer will notice this by a reduced concentration (or taste) of a taste component, meaning that the taste profile no longer appears rounded.

It was therefore an object of the present invention to develop a process for the encapsulation of aromas on particles, in particular food particles, which reduces or solves the problem of segregation in the end product. Moreover, it was the object of the present invention to develop a process from which particles with certain sizes (graininess) result which, in the end product, have a homogeneous mixture with the other food particles in the product in order to thus counteract the segregation. For example, the aromas which are applied to coffee particles should lead to particle sizes (graininess) which, in the end result in an instant coffee composition, lead to a homogeneous mixture with the other particles present in the instant composition. Furthermore, the particles from the process should have a good solubility and high aroma loading in order to bring about a long-lasting aroma release during consumption by the end consumer, and thus an improved taste experience, and in order to produce an improved aroma perception and possibly a surprising taste experience upon consumption.

DESCRIPTION OF THE INVENTION

The invention provides a process for the encapsulation of flavours and/or aromas on food particles comprising the steps:
   (i) preparation of an emulsion comprising at least one flavour and/or aroma and further customary ingredients,
   (ii) application of the emulsion to the food particles by means of spraying,
   (iii) drying of the particles in a stream of air,
where the bulk density of the particles increases as a result of the coating (step ii) by 5-50%, preferably 10-25%.

The bulk density pSch or else so-called tamped density, and also colloquially speaking "bulk weight", refers to the density, i.e. the mass per volume, of a quantity of a granular solid ("bulk material") and a continuous fluid which fills the cavities between the particles. The fluid may also be air. The individual components must not dissolve in one another.

In a further embodiment of the process according to the invention, the emulsion is sprayed through one or more nozzles, preferably from one or more two-substance nozzles, onto the food particles, where the average droplet size diameter of the droplets which emerge from the nozzle is less than 0.3 mm. Preferably, the average droplet size diameter is 0.05 mm-0.1 mm. As a result, agglomeration of the particles can be minimized and rapid drying is facilitated by the large surface area.

Surprisingly, it has been found that the particle sizes of the particles produced in this way, especially for the bulk density, were able to be optimally adjusted for the end product, meaning that they can be mixed homogeneously into a mixture of different (food) particles, such as, for example, into instant powder products. This has the advantage that segregation of the particles can be avoided. Moreover, it has the advantage that the taste profile of the composition is homogeneous for the consumer, and an aroma component does not undesirably accumulate at one place in the food.

The term "food" or "foodstuff" comprises in particular products which are foods in accordance with REGULATION (EC) No. 178/2002 OF THE EUROPEAN PARLIAMENT AND OF THE COUNCIL dated 28 Jan. 2002. According to this regulation, "foods" are all substances or products, whether processed, partially processed or unprocessed, intended to be, or reasonably expected to be ingested by humans.

In a further embodiment of the process according to the invention, the emulsion optionally comprises film formers which are present in the emulsion in a concentration of less than 20% by weight, preferably less than 10% by weight, particularly preferably less than 1% by weight.

In a further embodiment of the process according to the invention, the emulsion does not comprise a film former. As a result, for an application in which, for example, foam formation would be perceived negatively by the consumer, this can be reduced.

In a further embodiment of the process according to the invention, the process temperature during the drying is 20° C. to 150° C. The particles produced at these temperatures have an optimum particle size and loading of the flavours or aromas.

In a further embodiment of the process according to the invention, the food particles are preferably freeze-dried particles. Preferably, in particular, the freeze-dried particles are vegetables, fruits, coffee particles, tea, cereals etc. Furthermore, it is likewise possible for dry and lumpy foods such as noodles, rice, etc. to be used and thus coated.

The particles flavoured in this way are then preferably incorporated into end products such as instant coffee, instant beverages, muesli, cereals, muesli bars, tea bags, loose tea, dry soups, noodles, rice, etc. The flavoured particles can likewise be used in chewing gums, mouth care products, medicine products, food supplements, baby food etc., as well as in animal feed and feed compositions.

An advantage of this process as a result of using freeze-dried food particles is the better attachment of the flavours or aromas to the particles and the easier handleability of the raw materials.

Surprisingly, it has also been found that the particles produced in this way have a high aroma loading. This can be 10-50% by weight, preferably 15-35% by weight, in the spray solution or spray emulsion. A high aroma loading is particularly advantageous in order to bring about a long-lasting aroma release during consumption by the end consumer, and thereby an improved taste experience, and in order to produce an improved aroma perception and possibly a surprising taste experience upon consumption.

Accordingly, a further embodiment of the process according to the invention consists in the fact that the loading of a flavoured food particle after the encapsulation is at least 10-70% by weight, preferably at least 12-50% by weight, and in particular at least 15-25% by weight.

In a further embodiment of the process according to the invention, the process is a spray encapsulation, a spray granulation and/or a spray coating.

The specified processes offer the option of adjusting the desired parameters (temperature, bulk density etc.) for producing the particles in such a way that particles with high aroma loading are obtained.

Whereas the application of a liquid aroma to foods (or feeds), such as, for example, to freeze-dried coffee, is possible only in a very low dosage (e.g. 1-2% by weight), since otherwise the particles are changed in their structure and their appearance, the present process according to the invention allows considerably higher aroma loadings to be realized without the food (or feed) having decisive negative alterations.

In a further embodiment of the process according to the invention, the encapsulated flavours and/or aromas are an aroma mixture of at least two flavours and/or aromas. Preferably, it is a mixture of at least three, four or more than five flavours and/or aromas. In most cases, the aroma mixtures are a mixture of many flavours and/or aromas. This has the advantage that the taste profile of the composition can be influenced.

Suitable flavours for producing the particles of the present invention are preferably to be found e.g. in "Riechstoffe [Fragrances]", in Steffen Arctander, in "Perfume and Flavor Chemicals", Self-published, Montclair, N.J. 1969; H. Surburg, J. Panten, in "Common Fragrance and Flavor Materials", 5th Edition, Wiley-VCH, Weinheim 2006. By way of example, mention may be made of: esters (saturated or unsaturated) such as e.g. ethyl butyrate, allyl capronate, benzyl acetate, methyl salicylate; organic acids (saturated and unsaturated) such as e.g. butyric acid, acetic acid, methylbutyric acid, caproic acid; alcohols (saturated and unsaturated) such as e.g. ethanol, propylene glycol, octenol, cis-3-hexanol, benzyl alcohol, phenylethyl alcohol; aldehydes (saturated and unsaturated) such as e.g. acetaldehyde, isobutyraldehyde, nonadienal, benzaldehyde, 3-phenylacetaldehyde; ketones such as e.g. menthone; ethers such as e.g. 4-hydroxy-5-methylfuranone, 3-hydroxy-4,5-dimethyl-2-(5H)-furanone, 2,5-dimethyl-3-hydroxy-2(3H)-furanone, 2(5)-ethyl-4-hydroxy-5(2)-methyl-3(2H)-furanone, p-methoxybenzaldehyde, guaiacol, methoxyvinylphenol; acetals such as e.g. acetaldehyde diethyl acetal; lactones such as e.g. gamma-decalactone; terpenes such as e.g. limonene, linalool, terpinene, terpineol, citral (geranial and neral), menthol; sulphides and disulphides such as e.g. dimethyl sulphide, difurfuryl disulphide, methylthiopropanal; thiols such as e.g. methylfuranthiol; pyrazines and pyrrolines such as e.g. methylpyrazine, acetylpyrazine, 2-propionylpyrroline, 2-acetylpyrroline, acetophenone, allyl capronate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl capronate, butylidenephthalide, carvon, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprinate, ethyl capronate, ethyl crotonate, ethylfuraneol, ethylguaiacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzylacetone, isoamyl alcohol, isoamyl isovalerate, isobutyl butyrate, isobutyraldehyde, isoeugenol methyl ether, isopropylmethylthiazole, lauric acid, leavulinic acid, linalool, linalool oxide, linalyl acetate, menthol, menthofuran, methyl anthranilate, methylbutanol, methylbutyric acid, 2-methylbutyl acetate, methyl capronate, methyl cinnamate, 5-methylfurfural, 3,2,2-methylcyclopentenolone, 6,5,2-methylheptenone, methyl dihydrojasmonate, methyl jasmonate, 2-methylmethyl butyrate, 2-methyl-2-pentenolic acid, methyl thiobutyrate, 3,1-methylthiohexanol, 3-nnethylthiohexyl acetate, nerol, neryl acetate, trans,trans-2,4-nonadienal, 2,4-nonadienol, 2,6-nonadienol, 2,4-nonadienol, nootkatone, delta-octalactone, gamma octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegon, pulegol, sinensal, sulphurol, terpinolene, 8,3-thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3(2H)-furanone and modifications thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol modifications (here preferably ethylmaltol), coumarin and coumarin modifications, gamma-lactones (here preferably gamma-undecalactone, gamma-nonalactone, gamma-decalactone), delta-lactones (here preferably 4-methyldeltadecalactone, massoi lactone, delta-decalactone, tuberolactone), methyl sorbate, divanillin, 4-hydroxy-2(or 5)-ethyl-5(or 2)-methyl-3(2H) furanone, 2-hydroxy-3-methyl-2-cyclopentenone, 3-hydroxy-4,5-dimethyl-2(5H)-furanone, acetic acid isoamyl ester, butyric acid ethyl ester, butyric acid n-butyl ester, butyric acid isoamyl ester, 3-methylbutyric acid ethyl ester, n-hexanoic acid ethyl ester, n-hexanoic acid allyl ester, n-hexanoic acid n-butyl ester, n-octanoic acid ethyl ester, ethyl 3-methyl-3-phenylglycidate, ethyl 2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfuryl mercaptane, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2 (5H)-furanone, cinnamaldehyde, cinnamyl alcohol, methyl salicylate, isopulegol, and (not explicitly specified) stereoisomers, enantiomers, positional isomers, diastereomers, cis/trans-isomers and epimers of these substances.

Advantageously, an emulsion for the encapsulation comprises a plurality of ingredients which contribute to the stability, shape, colour, rheology etc. Accordingly, a further embodiment of the process according to the invention consists in the fact that the further customary ingredients are selected from the group consisting of dyes, sweeteners, fillers, buffers, plant extracts, coffee whiteners, bleaches, food supplements (minerals, ballast substances), saccharides, tea extracts, cocoa etc.

INDUSTRIAL APPLICABILITY

The present invention also provides flavoured food particles or feed particles obtainable by the process according to the invention, which is described above and which comprises the steps:
(i) preparation of an emulsion comprising at least one flavour and/or aroma and further customary ingredients,
(ii) application of the emulsion to the food particles or feed particles,
(iii) drying of the particles in a stream of air,
where the bulk density of the particles increases as a result of the coating (step ii) by at most 5-50%, preferably by at most 5-25%.

In a further embodiment of the present invention, the flavoured food particles produced in this way are incorporated into end products such as instant coffee, instant beverages, tea leaves (loose or in teabags), fruits, muesli, dry soups (instant soups), cornflakes, popcorn, rice, noodles etc. The flavoured particles can also be used in chewing gums, mouth care products, medicine products, food supplements, baby food etc., as well as in animal feed and feed compositions.

The flavoured particles produced in this way (such as, for example, food or feed particles) have properties which improve or reduce the disadvantages of segregation and low aroma loading. In particular, the process according to the invention can advantageously be carried out for coffee particles. In this connection, particularly freeze-dried coffee particles are used and the aroma emulsion is sprayed thereon.

Accordingly, the present invention further provides in particular flavoured coffee particles obtainable by the aforementioned process. In this connection, a preferred embodiment is instant coffee, comprising the flavoured coffee particles according to the invention.

EXAMPLES

Aroma Emulsion for Encapsulation

TABLE 1

Aroma emulsion A

| Ingredients | % by weight |
| --- | --- |
| Water | 35.5 |
| Gum arabic | 7.2 |
| Maltodextrin | 21.5 |
| Vanillin | 28.6 |
| Caramel aroma | 7.2 |

TABLE 2

Aroma emulsion B

| Ingredients | % by weight |
| --- | --- |
| Water | 38.8 |
| Cocoa | 41.6 |

TABLE 2-continued

Aroma emulsion B

| Ingredients | % by weight |
|---|---|
| Vanillin | 11.2 |
| Cocoa aroma | 8.4 |

Encapsulation of Food Particles

Particles, specifically food particles, specifically coffee particles, were coated with the aroma emulsion A and B. The freeze-dried coffee particles are, for example, fluidized in a fluidized bed and then sprayed with the aroma emulsion A or B by means of one or more nozzles. As a result of the temperature prevailing in the fluidized bed (below the melting temperature or glass transition temperature of the essential emulsion constituents), the aqueous aroma emulsion is dried, meaning that a coating layer is formed around the freeze-dried coffee particles. This is coloured by adding colour-imparting components (such as dyes and/or plant extracts) in such a way that the product corresponds to the freeze-dried coffee granules used.

The particles were produced using an Aeromatic Strea1, at 80° C. incoming air temperature and a drying air rate of 80 m3/h. The spray emulsion was added here at a rate of 26 g/min.

Determination of the Aroma Loading

The aroma loading is determined both sensorially and analytically in accordance with the prior art.

For the determination of the analytical aroma loading, firstly a sample preparation corresponding to the prior art, for example by extraction, is performed. Then, this extract is analyzed accordingly. The analysis can take place by means of customary methods, such as, for example, by means of high-pressure chromatography or gas chromatography.

In the present example, tea particles were coated with an aroma emulsion corresponding to the process according to the invention. At regular intervals, samples were taken for the analysis. The tea particles were analyzed as to the flavours present in the aroma semi-quantitatively using an internal standard (2-nonanol). The following concentrations of flavours were able to be analyzed in the case of the coated tea:

TABLE 3

Determination of aroma loading on tea particles

| Sample | Flavours ppm |
|---|---|
| 1 | 22.7 |
| 2 | 25.9 |
| 3 | 20.2 |
| 4 | 24.2 |
| 5 | 25.3 |
| 6 | 26.6 |
| 7 | 22.6 |
| 8 | 29.7 |
| 9 | 23.2 |
| 10 | 25.6 |

Determination of the Tamped Density

The tamped density of the aroma particles according to the invention was determined using a tamping volumeter (STAV-II, Engelsmann) in accordance with DIN 53194. The comparison used is the corresponding tamped density of the uncoated food, in this case freeze-dried coffee.

TABLE 4

Tamped density of aroma particles according to the invention

| Freeze-dried coffee | 260-280 g/l |
|---|---|
| Aroma particles | 270-310 g/l |

Segregation Test

The segregation behaviour of coated, freeze-dried coffee was observed by means of a tamping volumeter. For this, the aroma particles (e.g. coated freeze-dried coffee) were mixed 10% with food particles (e.g. freeze-dried coffee) and assessed visually after 1250 strokes each of 2 cm.

The comparison used is a mixture of freeze-dried coffee with conventional encapsulated caramel aroma particles (for example spray-dried, fluidized-bed-granulated, extruded, compacted, roll-dried).

TABLE 5

Results of the segregation test

| Encapsulated aroma particles | According to the invention | Spray-dried | Fluidized-bed-granulated | Extruded | Compacted | Roll-dried |
|---|---|---|---|---|---|---|
| Typical particle diameter [mm] | 0.5-4.0 | 0.05-0.3 | 0.1-1.2 | 0.1-4.0 | 1.0-3.5 | 0.5-4.0 |
| Result after segregation test | Homogeneous | Inhomogeneous, with sediment | Inhomogeneous, with sediment | Inhomogeneous, with sediment | Inhomogeneous, partial accumulation | Inhomogeneous |

Stability Test and Sensory Test

A) For the sensory evaluation, the coated particles were tasted against the corresponding amount of liquid aroma in an expert panel with 7 subjects. For this, the flavoured particles or the liquid aroma were incorporated into the end application and this was then assessed. The results give the average value of the 7 subjects and are summarized in Table 6.

B) The storability of the flavoured, coated particles (e.g. freeze-dried coffee) was determined by means of a real-time test over a period of 12 months.

For this, samples and reference samples stored in each case at room temperature and minus 18° C. were compared sensorially against one another in the expert panel. For this, the flavoured food particles (coated freeze-dried coffee) were homogeneously mixed with a dosage of 10% with the correspondingly nonflavoured food particles (freeze-dried coffee). 1 g of this is dissolved to 100 ml of approx. 80° C. hot water/milk mixture (80% water, 20% milk with 1.5% fat content) and tasted.

Furthermore, the coated particles were compared sensorially against particles onto which a corresponding aroma (liquid aroma) had been sprayed (=standard). To produce the standard, the corresponding aroma (for example cocoa aroma) was sprayed with a dosage of 2% onto the food (for example freeze-dried coffee). The further preparation with coffee beverage takes place as described above.

Surprisingly, it was able to be established that the particles produced according to the invention have no sensory losses, whereas, by contrast, the liquid-flavoured food particles exhibited off-notes and decreasing taste intensity after a few months.

TABLE 6

Results of the stability test and sensory test

Storage time = 12 months

| Particles | Taste note | Aroma impression |
|---|---|---|
| With aroma emulsion A stored at RT | Coffee, caramel | Intensive |
| With aroma emulsion A stored at −18° C. | Coffee, caramel | Intensive |
| Standard A stored at RT | Considerable off-notes, rubber-like | Considerable lower intensity |
| With aroma emulsion B stored at RT | Coffee, caramel | Intensive |
| With aroma emulsion B stored at −18° C. | Coffee, caramel | Intensive |
| Standard B stored at RT | Considerable off-notes, rubber-like, rancid | Considerable lower intensity |

RT = Room temperature

The invention claimed is:

1. A process for the coating of aroma compounds on freeze-dried coffee particles comprising the steps:
   (i) preparing an emulsion comprising at least one aroma compound and further customary ingredients selected from the group consisting of dyes, sweeteners, fillers, thickeners, buffers, plant extracts, coffee whiteners, bleaches, flavour boosters, food supplements, saccharides, tea extracts, cocoa and mixtures thereof, wherein the emulsion is free of film-formers;
   (ii) spraying the emulsion of step (i) onto freeze-dried coffee particles through a nozzle to produce coated freeze-dried coffee particles having a coating of the emulsion,
   (iii) drying of the particles in a stream of air having a temperature of from about 80° C. to about 150° C.,
   wherein the average sprayed droplet size diameter of said emulsion is in a range from 0.05 mm to 0.3 mm,
   the tamped density of the particles increases as a result of the coating (step ii) by 5 to 50%, and after step (iii), the coated freeze-dried coffee particles are added to non-coated freeze-dried coffee particles in a homogenous mixture and wherein the homogenous mixture has less segregation after 12 months than the non-coated freeze-dried coffee particles, and wherein
   the freeze-dried coffee particles are fluidized in a fluidized bed and then sprayed with the aroma emulsion by the nozzle.

2. The process of claim 1, wherein the emulsion is sprayed through one or more two-substance nozzles.

3. The process of claim 1, wherein the coated freeze-dried coffee particles produced by the process are such that the aroma compounds in the coating coated on the coated freeze-dried coffee particles weighs from 10% to 70% by weight based on the weight of the coating.

4. The process of claim 1, wherein the tamped density of the particles increases as a result of the coating by at most 25%.

5. The process of claim 1 wherein the spraying step (ii) is selected from the group consisting of a spray encapsulation process, a spray granulation process and a spray coating process.

6. The process of claim 1, wherein the encapsulated aroma compounds are a mixture of at least two aroma compounds.

7. Flavoured freeze-dried coffee particles obtainable or obtained by the process of claim 1.

8. Flavoured freeze-dried coffee particles obtained by the process of claim 1 which have an average particle size of from 0.5 to 4.0 mm.

9. The process of claim 1, wherein the coated freeze-dried coffee particles produced by the process are such that the at least one aroma compound in the coating coated on the coated freeze-dried coffee particles is loaded on the freeze-dried coffee particles from 10% to 70% by weight based on the weight of the coated freeze-dried coffee particles.

10. The process of claim 9, wherein the loading is from 10% to 60%.

11. The process of claim 9, wherein the loading is from 10% to 50%.

12. The process of claim 1 wherein the emulsion has a water content of from about 35.5% to about 38.8% by weight based on the total weight of the emulsion.

13. A process for the coating of aroma compounds on freeze-dried coffee particles comprising the steps:
   (i) preparing an emulsion comprising at least one aroma compound and further customary ingredients selected from the group consisting of dyes, sweeteners, fillers, thickeners, buffers, plant extracts, coffee whiteners, bleaches, flavour boosters, food supplements, saccharides, tea extracts, cocoa and mixtures thereof;
   (ii) spraying the emulsion of step (i) onto freeze-dried coffee particles through a nozzle to produce coated freeze-dried coffee particles having a coating of the emulsion,
   (iii) drying of the particles in a stream of air having a temperature of from about 80° C. to about 150° C.,
   wherein the average sprayed droplet size diameter of said emulsion is in a range from 0.05 mm to 0.3 mm,
   the tamped density of the particles increases as a result of the coating (step ii) by 5 to 50%,
   the coated freeze-dried coffee particles produced by the process are such that the aroma compounds in the coating coated on the coated freeze-dried coffee particles are loaded on the freeze-dried coffee particles from 10% to 70% by weight based on the weight of the coated freeze-dried coffee particles, and wherein
   the freeze-dried coffee particles are fluidized in a fluidized bed and then sprayed with the aroma emulsion by the nozzle.

* * * * *